No. 865,610. PATENTED SEPT. 10, 1907.
F. C. NEWELL.
ELECTRIC REGULATOR.
APPLICATION FILED OCT. 22, 1904.
3 SHEETS—SHEET 3.
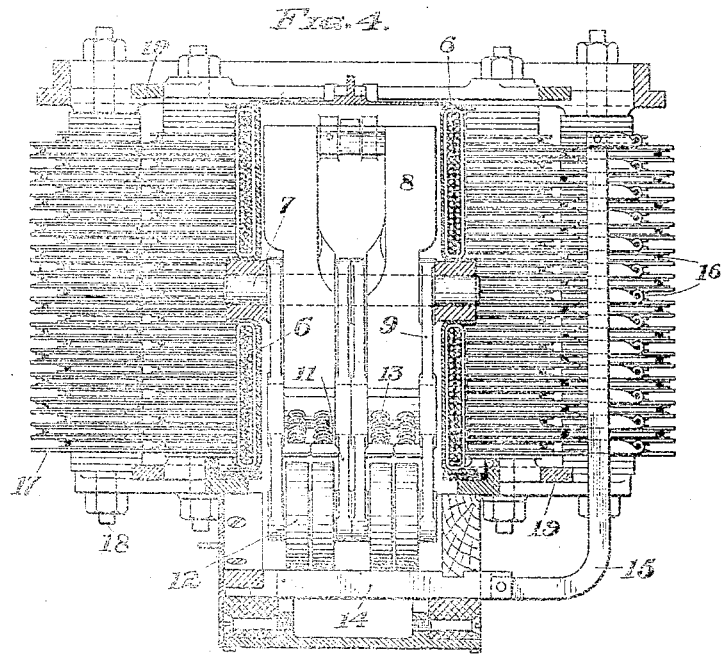
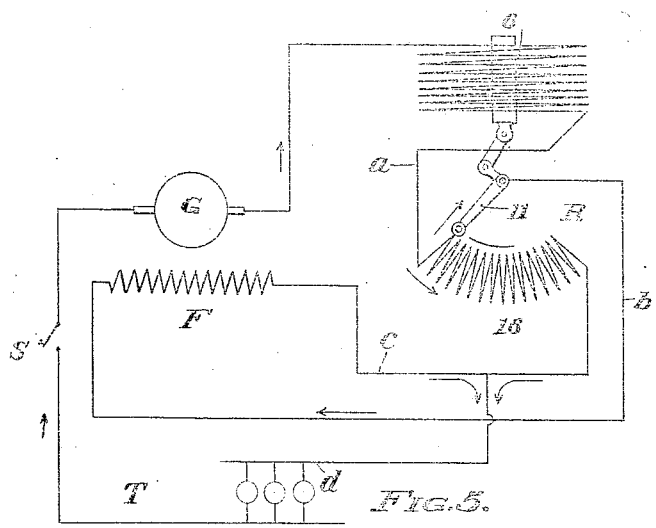
WITNESSES
INVENTOR,
Frank C. Newell,
By Paul Synnestvedt
Atty.

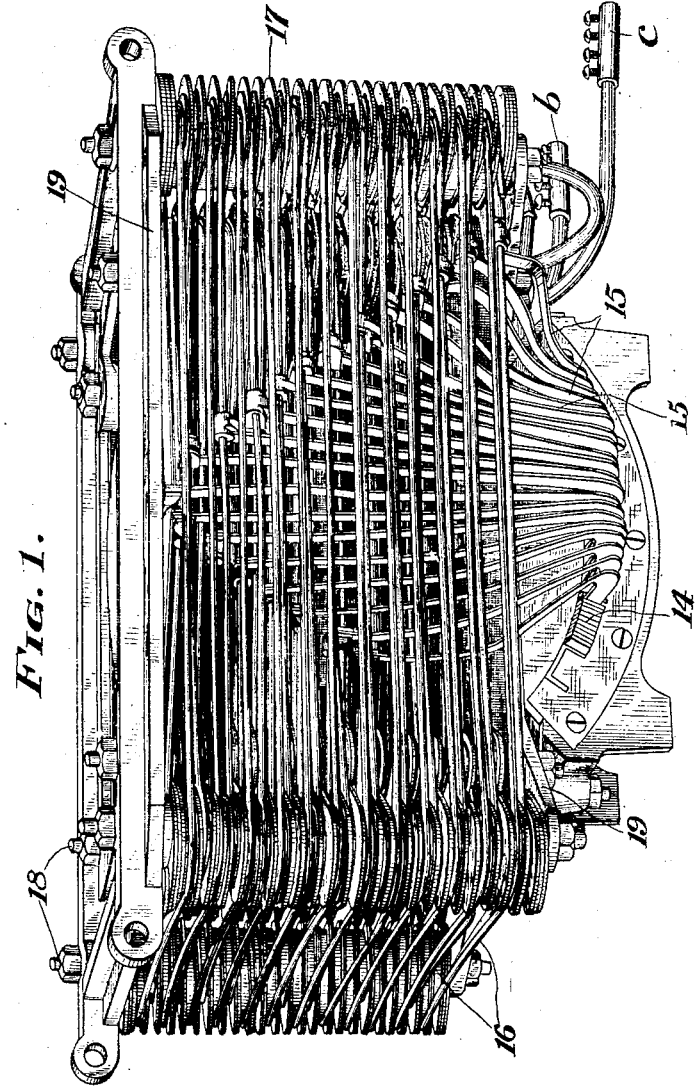

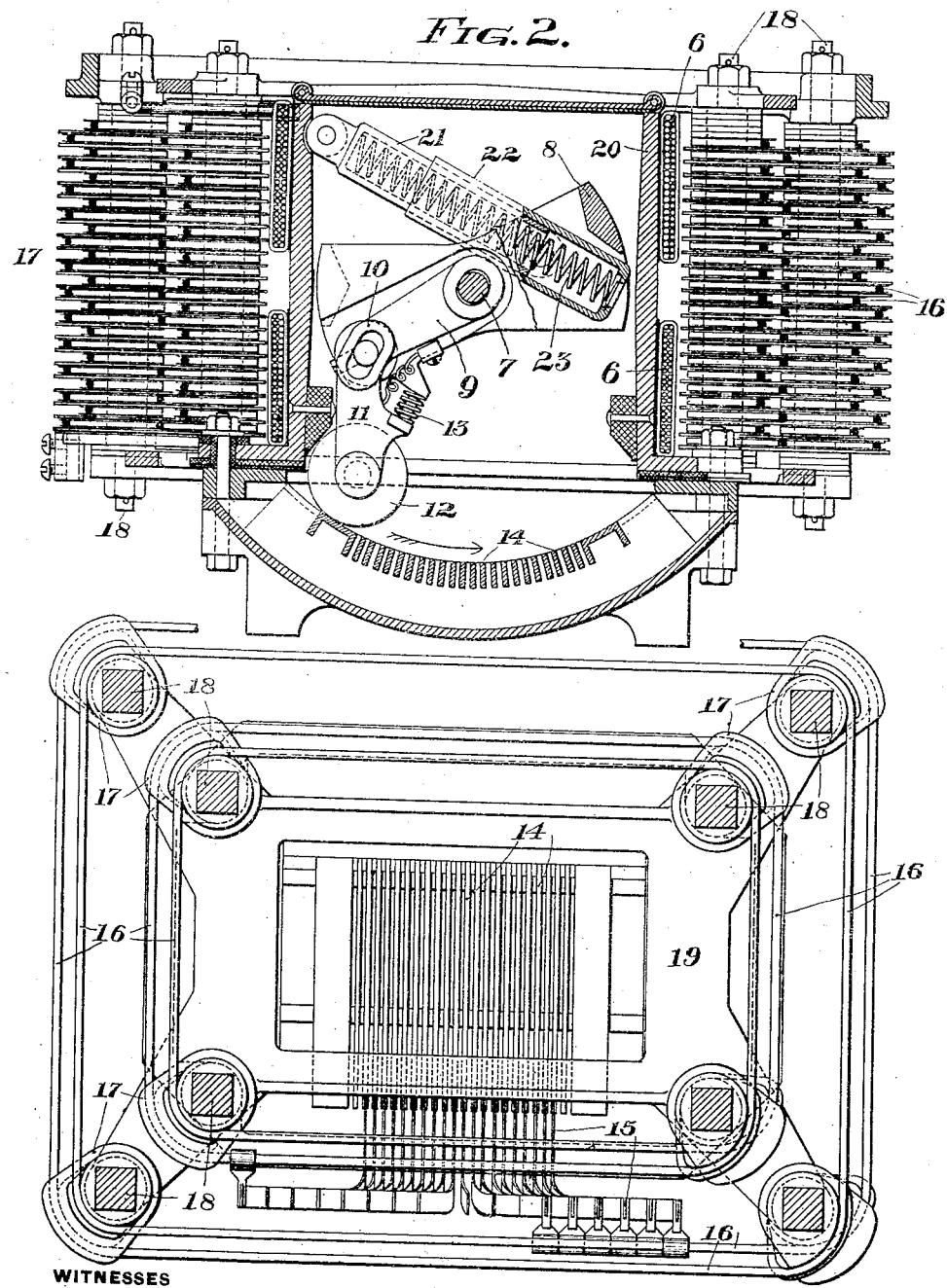

UNITED STATES PATENT OFFICE.

FRANK C. NEWELL, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRIC REGULATOR.

No. 865,516.    Specification of Letters Patent.    Patented Sept. 10, 1907.

Application filed October 22, 1904. Serial No. 229,584.

*To all whom it may concern:*

Be it known that I, FRANK C. NEWELL, a citizen of the United States, residing at Wilkinsburg, in the county of Allegheny and State of Pennsylvania, have invented a certain new and useful Electric Regulator, of which the following is a specification.

My invention relates to electric generators, and especially to means for automatically controlling the output of a variable speed generator. Its object is, in general, to avoid the production of any more current at the generator than is necessary for actual use in the circuit; and in particular, to control the current by devices which are automatically operated by the said current, to regulate the voltage of the circuit, as by varying the strength of the field of the generator. Other objects are, to provide an electro-magnetic regulator for these purposes; and to delicately adjust and insure operation of the regulator promptly so as to automatically shift certain resistances into or out of a circuit containing the exciting field coils of the generator. These objects, and other advantages which will hereinafter appear, I attain by the construction and arrangement of apparatus as illustrated in the accompanying drawings, wherein—

Figure 1 is a perspective view of an arrangement of coils for the purpose of my invention;

Figure 2 is a vertical section through the regulator;

Figure 3 is a horizontal section of the same with the controller bar removed;

Figure 4 is a vertical section taken at right angles to the section of Figure 2, and Figure 5 is a diagram showing for illustration, an arrangement of the several coils and other parts with respect to the generator.

It has been customary to regulate the current supplied to any translating device by simply introducing resistance in the circuit between the generator and the translating device, leaving the voltage at the generator the same. This is very inconvenient and often practically impossible to accomplish automatically. If the generator has variable speed there is not only constant waste of power, but there is great danger of burning out connections and insulation by the rapid building up of field strength and the production of more current than can be used. Though my invention is of course not limited to any particular apparatus or use, it may for illustration be described as adapted for use on electric cars where the motor is employed as a generator when running by momentum, to supply current for an electric brake. In such apparatus, especially where the field is excited by a coil in a branch of the main circuit, whether shunt or series wound, the above difficulties are pronounced, but are readily overcome by my regulator.

Referring first to the diagram of Figure 5, which illustrates such apparatus; the generator G with exciting field F is in circuit with the coil 6 which is used as hereinafter described for the purpose of shifting the arm 11, so as to cut in the resistance of a rheostat R. The resistance coil 16 is connected both to the field F of the generator and to a translating device T on which the current is to be used. Another branch of the circuit leading from the rheostat is through line *b* which completes the circuit through the field of the generator and then through the connection *c* joins the wire *d* leading to the translating device T.

In the apparatus shown in Figures 2, 3, and 4, especially, there is provided the coil 6 which may be made of a few turns of heavy copper wire, and in the field of this coil upon the shaft 7, I have mounted electro-magnetically-operated controller bars 8 in such a position that when the current passes through the coil 6 the bars will have a tendency to take a vertical or axial position within the coil 6. I may use one or more such controller bars. Connected with them are arms 9, carrying pivotally mounted levers 11 pivoted at 10 to ride loosely and each carrying a contact wheel 12 which rolls over the contact bars 14 of the rheostat. The wheels 12 move independently and each is kept pressed down by a spring 13 into close contact, but all of them have electrical connection with the shaft 7, which connects with the wire *b* of Figure 5.

The controller bars 8 are designed to be a little off balance when the current begins to flow.

To retain them in their positions shown and to return them after displacement, as well as to provide resistance to regulate the amount of movement, the two telescoping tubes 21, 22, contain the coil compression spring 23. The inside tube 21 is pivoted at its upper end to the casing upon which the resistance coil 6 is wound, and the outer tube 22 is pivoted at the sides, as indicated in dotted lines, to the bar 8. The spring 23 is of course adjusted to yield at the desired limit of amperage at which the magnetic pull or repulsion is to turn the controller bars and move the contact wheels 12. Conveniently arranged around the box 20 are a series of resistance coils 16, which may be made of iron wire, and they are connected to the contacts 14 by the branches 15 as they are shown in Figure 3, the arrangement being such that as the contact wheels 12 roll in the direction of the arrow, in Figure 2, the current from branch *a* will be sent through a greater number of coils 16 of the rheostat,—that is, more resistance is introduced in series with the field coils. Coils 16 may be conveniently wound as shown, upon spools 17 mounted upon the vertical bolts 18 and held upon the base plates 19.

Referring now to the diagram of Figure 5; when the switch S is closed, the generator G (supposed to be in motion) sends current through the coil 6 and causes the controller bars to tend to take a vertical attitude in opposition to the springs 23, giving the contact wheels 12 along the surfaces of the contacts 14 of the rheostat. As the parts now stand in Figure 5 it will be seen that when the current in wire a arrives at the junction between the coil 16 and the arm 11 it will divide, part going through the branch b directly through the field F of the generator, and the rest going through the resistance coil 16 and thence through branch d and the translating device T, after joining the current in the wire c. That is, the field F is in a loop around the rheostat and a large part of the current will go directly from wire a to wire b, through the field, and then to the translating device, while a smaller part will go through the rheostat coil 16 in parallel and then to the translating device. But as the arm 11 moves along the rheostat more resistance is cut into series with the field circuit, between branch a and the branch b, so that the field coil of the generator has the less current and therefore produces less voltage of the armature and reduces the current of the generator circuit. The current in coil 6 will thus directly govern the position of the controller bar 8 and the excitation of the field, and govern the current through the translating device T so it shall not rise above a particular voltage, thus avoiding the danger of burning out connections and also avoiding waste of power consequent upon generating greater current than is necessary for the purposes of the apparatus.
It will be understood of course that this general principle of varying the resistances in the main and branch circuits so as to cut down the voltage generated at G by means of a coil 6 which is traversed by the current in the main circuit and operates the rheostat, is applicable to various forms of apparatus and is not confined to the specific apparatus herein set forth for illustration.

Having thus described my invention and illustrated its use, what I claim as new and desire to secure by Letters Patent, is the following:

1. An electric regulator comprising a main generator circuit having a rheostat in series, a second circuit for exciting the field of the generator, having one terminal connected to the main circuit, and a magnetically operated shiftable contact member for the rheostat constituting the other terminal of the second circuit.

2. An electric regulator comprising a main generator circuit having a rheostat in series, a second circuit for exciting the field of, the generator having one terminal connected to the main generator circuit, and an automatic shiftable contact member for the rheostat magnetically operated from the main circuit and constituting the other terminal of the second circuit.

3. The combination with a generator having a main circuit and a second circuit carrying an exciting field coil with one terminal connected to the main circuit and the other terminal constituting a movable rheostat contact member, of a rheostat and a coil in the main circuit, and devices by which said coil magnetically operates the rheostat contact member, said devices comprising a controlling bar in the magnetic field actuating several common contact arms, said contact arms comprising resiliently mounted rollers to engage the contact points of the rheostat.

4. In combination in an electric regulator, resistance coils, an exciting coil within the same, a magnetically operable bar pivoted and resiliently supported within the exciting coils, a series of contact points for the resistance coils, and a contact arm carried by the bar and adapted to engage the contact points.

5. In a regulator the combination with a generator circuit and a second circuit for exciting the field thereof, of resistance coils 17, connected contacts 14, an actuating coil 6, magnetic bar 8 resiliently pivoted therein, and a series of contact rollers 12 connected with said bar to shift contact along said rheostat contacts, the exciting coil 6 being within the resistance coils 17, substantially as described.

6. In an electric regulator the combination with a suitable supporting frame, of resistance coils, an exciting coil inside the same, a magnetically operated bar pivoted and resiliently supported within the exciting coil and several resiliently mounted contact arms making engagement between said bar and the contact points of the resistance coils, substantially as described.

7. The combination with a generator and a main circuit containing a rheostat having a movable contact member for securing connections at different points on the rheostat and an energizing winding, of a part operable by such winding for automatically shifting the contact member, and a second circuit for the exciting field coil having one end thereof connected to the contact member and the other end connected to the main circuit at one side of the rheostat.

8. The combination with a generator and a main circuit containing an energizing winding and a rheostat having a movable contact member for securing connections at different points on the rheostat, of a part operable by such winding for automatically shifting the contact member, and a second circuit for the exciting field coils having one end thereof connected to the contact member and the other end thereof connected to the main circuit on the return side of the rheostat.

9. In combination with a generator and a main circuit including an operating winding and a rheostat provided with a shifting contact member, of magnetic means adapted to be operated by the winding and connected to the contact member and a second circuit for the exciting field coils connected at one end to the main circuit on the return side of the rheostat and connected at the other end with the shifting contact member on the rheostat whereby the amount of resistance in front of the contact member and the amount of current in the second circuit is controlled by the current in the main circuit.

In testimony whereof I have hereunder signed my name in the presence of the two subscribed witnesses.

FRANK C. NEWELL.

Witnesses:
PAUL SYNNESTVEDT
FRED LEARY.